US008432253B2

(12) United States Patent  (10) Patent No.: US 8,432,253 B2
Ainsbury et al.  (45) Date of Patent: Apr. 30, 2013

(54) ZONE DETERMINATION BY COMBINING SIGNAL STRENGTH WITH TOPOLOGICAL FACTORS

(75) Inventors: Robert Ainsbury, Woodbury, MN (US); Immad Adawiya, Amman (JO); Khalid Omar, Amman (JO)

(73) Assignee: Al-Qemmah Letechnologia Al-Ma'Loumat Co. (SIMTIX), Amman (JO)

( * ) Notice: Subject to any disclaimer, the term of this patent is extended or adjusted under 35 U.S.C. 154(b) by 1167 days.

(21) Appl. No.: 12/338,739

(22) Filed: Dec. 18, 2008

(65) Prior Publication Data
US 2010/0156599 A1  Jun. 24, 2010

(51) Int. Cl.
*H04Q 5/22* (2006.01)
(52) U.S. Cl.
USPC ......... 340/10.1; 340/8.1; 340/10.2; 340/10.3; 340/10.31; 340/572.1; 340/539.13; 342/42; 342/43; 342/44; 342/195; 342/450; 342/451; 342/453; 342/458; 342/463; 342/465
(58) Field of Classification Search ................ 340/10.1, 340/539.1, 539.13, 572.1, 527.4, 8.1, 10.2, 340/10.3, 10.31; 342/42, 43, 44, 195, 450, 342/451, 453, 458, 463, 465
See application file for complete search history.

(56) References Cited

U.S. PATENT DOCUMENTS

| | | | |
|---|---|---|---|
| 6,674,403 B2 * | 1/2004 | Gray et al. ................... 342/463 |
| 7,180,420 B2 * | 2/2007 | Maurer ..................... 340/572.1 |
| 7,538,715 B2 * | 5/2009 | Langford et al. ............... 342/90 |
| 2006/0187029 A1 * | 8/2006 | Thomas ................... 340/539.13 |
| 2007/0236337 A1 * | 10/2007 | Braun et al. ............... 340/10.34 |
| 2007/0247315 A1 * | 10/2007 | Nagai et al. ................ 340/572.4 |
| 2008/0165058 A1 * | 7/2008 | Ayachitula et al. .......... 342/359 |
| 2009/0216438 A1 * | 8/2009 | Shafer .......................... 701/210 |
| 2009/0243800 A1 * | 10/2009 | Haustein et al. ............ 340/10.1 |

* cited by examiner

*Primary Examiner* — Benjamin C Lee
*Assistant Examiner* — Quang D Pham
(74) *Attorney, Agent, or Firm* — Michael A. Glenn; Glenn Patent Group

(57) ABSTRACT

Active RFID technologies are used to tag assets and people within buildings or open areas, such as parking lots or military bases; and to identify, preferably within a few meters, the real-time location (RTL) of the tag, i.e. to create a real-time location system, known as an RTLS. A novel and complex algorithm is provided that combines signal strength computations with factors that incorporate physical realities, such as walls and floors, to determine a tag's real-time location more accurately.

2 Claims, 2 Drawing Sheets

ZONE DETERMINATION BY COMBINING SIGNAL STRENGTH WITH TOPOLOGICAL FACTORS

BACKGROUND OF THE INVENTION

1. Technical Field

The invention relates to protecting sensitive facilities by tracking the movement of objects and persons within such facilities. More particularly, the invention relates to zone determination by combining signal strength with topological factors.

2. Description of the Prior Art

Advanced security within facilities was, until recently, was restricted to highly sensitive establishments such as embassies, banks and intelligence groups. The vast majority of facilities simply had perimeter control, with security staff controlling who could enter a building, but once inside people could (with a little tenacity) access almost any area.

Over the past 20 years, with an increased awareness of intellectual and asset theft, many facilities introduced access control badges to restrict access within a facility. But these basic security technologies are easily by-passed. An intruder, for example, can use a stolen (or borrowed) employee badge; contractors (such as janitorial staff) often have facility wide clearance, and intruders frequently simply ask an employee to let them into a restricted area.

With growing incidents of terrorism, pervasive intelligence and company secrets theft, and fear of VIP abduction, forward thinking companies have begun to introduce internal biometrics and other technologies to manage and control access to areas or zones within a facility. But these technologies quickly begin to affect productivity and morale.

Once again the security organization faces the tradeoff between securing a facility, while allowing operations to proceed virtually unhindered.

In view of the continuing risk to property and human life attendant with today's industrial espionage, terrorism and theft, it would be advantageous to provide techniques for minimizing threats and risks within at-risk facilities while allowing normal operations to proceed with minimal disruption. One way to do this is to track the movement of objects and persons within such facilities. For example, active RFID technologies are often used to tag assets and people within buildings or open areas, such as parking lots or military bases. Most real time location systems (RTLS) use a mesh of multiple readers, typically a minimum of three readers, to triangulate the location of the tracked object, e.g. an object bearing an RFID tag. These systems rely on the fact that the tag signal strength diminishes with distance. The signal strength of the tag transmission is then determined from multiple locations. The location of the tag is computed by estimating the distance from multiple readers and, thereafter, estimating the probable location of the object.

Some RFID technologies, however, do not exhibit a smooth reduction in signal strength over distance, making the RTLS computations spurious. It would be advantageous to provide a more reliable way to track objects and persons within critical facilities; that is, more accurately determine the zone of objects and persons in near real-time.

SUMMARY OF THE INVENTION

Active RFID technologies are used to tag assets and people within buildings or open areas, such as parking lots or military bases. Part of the functionality in this embodiment identifies, preferably within a few meters, the real-time location (RTLS) of the tag, i.e. to create a real-time location system, known as an RTLS. In an embodiment, a novel and complex algorithm is provided that combines signal strength computations with factors that incorporate physical realities, such as walls and floors, to determine a tag's real-time location more accurately.

DETAILED DESCRIPTION OF THE INVENTION

This embodiment of the invention comprises a security platform that makes extensive use of RFID technologies to track the current location of tagged objects, e.g. people and assets. Additionally, applications that use the security platform may divide a physical environment into a collection of zones, with each zone having its own permissions and rules, e.g. no visitors are permitted in Zone 3.

The security platform uses a variety of inputs to determine in which zone a tagged object resides. These inputs include reads from tag readers, object usage of fixed devices, e.g. a biometric scan, and information pushed from an external application.

In some cases, a determination of a zone change, i.e. that a tag appears to have moved from one zone to another, can trigger important events within an application. If an unauthorized tag, for example, enters a restricted zone, all of the doors in the building may be locked, and sirens sounded. Given there are potentially significant consequences of zone changes, it is essential that the system accurately determine a tag's current zone, and yet also quickly determine when a zone has changed.

A facility, such as a campus, a building, or an industrial plant, is divided into zones. These zones allow an application to establish rules for each zone, and to report which objects are in each zone. Examples of zones include: Hanger 4, Floor 12, Conference Room 6, Room 1207, Photocopier 6. Each zone represents the smallest area of a facility that share common rules, e.g. who is allowed in the zone, whether one object must be in proximity to another when in the zone, and whether object can be moved within the zone, or removed from the zone. In reality, however, a zone may comprise multiple devices, such as RFID readers, and the zone determination module may compute an objects proximity to a device that is situated within a zone, e.g. reader 2.

Example Topology

Figure 1:
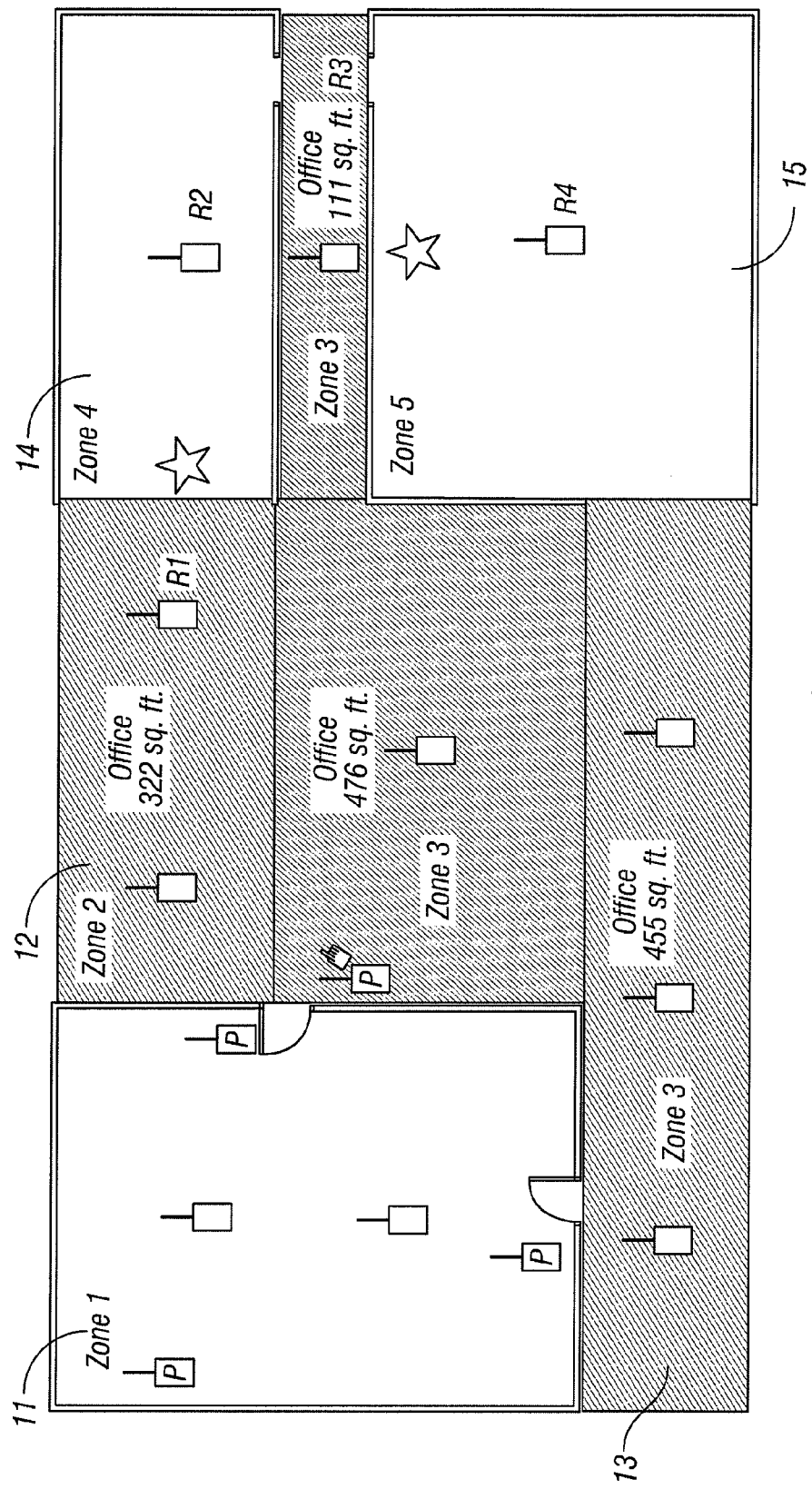
FIG. 1 is a block schematic diagram that provides an example of a real world zone topology according to an embodiment of the invention.

FIG. 1 is a block schematic diagram that provides an example of a real world zone topology. In the example of FIG. 1, the topology presents many of the challenges that the zone determination algorithm must accommodate.

Some of the important characteristics evident in this floor plan include:

Zone 1 (11) is not an open zone, i.e. it can only be accessed by going through one door, but people can leave from two doors.

Zone 2 (12) and Zone 3 (13) are not separated by any physical barriers, and users are free to walk between the zones unimpeded.

Zone 3 is a non-rectangular shape.

Someone in Zone 2 is highly unlikely to jump to either Zone 4 (14) or Zone 5 (15) without going through Zone 3, but it is not impossible to do so.

Parts of Zone 5 are dead, where the tags in Zone 5 are not read by Zone 5, but may be read by Zone 4.

The Challenge

Most RFID systems use one or both of two basic approaches to determine the location of a tag:

1. They have a mesh of signal readers. The transponder is assumed to be closest to the reader that received the strongest signal from the transponder.

2. In a more sophisticated environment, the system may triangulate a more accurate determination of the tags location, based on the signal strengths captured at multiple readers. The distance from each reader being approximated from the signal strength. By taking three readers across two planes the location of the signal can be estimated.

The flaw of both approaches is that they solely rely on signal strength to compute location, and the signal strength in reality (specifically, in multi-story buildings) is subject to significant variations in signal strength. A static reader and a static transponder can often give varying signal strength readings over time. Even though neither is moving, the system erroneously computes varying locations based on the signal strength fluctuations.

An additional problem is that the nearest reader to a transponder may in fact be in a different location. This may cause mis-location computations, even when there are no fluctuations in signal strength. Imagine, for example, a multi-story building with readers located above the tiles in ceilings on each floor. A transponder located on the $4^{th}$ floor may be physically closer to the reader in the ceiling of the $3^{rd}$ floor than the reader directly overhead.

One way to mitigate these spurious signal strength variations is to average signal strength over time. But this approach introduces significant latency, and is unacceptable in situations where rapid changes in location need to be identified in near real time.

A Presently Preferred Embodiment

The herein disclosed proprietary algorithms use a combination of statistical and topographical data to significantly diminish the errant effect of spurious signal strength readings. The following discussion presents an embodiment of the invention.

Conceivably a tag may be read by eight or more readers in a highly-zoned, multi-floor facility. Because of the physical layout, the nearest reader may, in fact, be in a different zone. Thus, an overall approach comprises an embodiment of the invention that uses an algorithm to identify the nearest reader to the tag, eliminating readers that the tag is unlikely to have been able to traverse to in the time since the last read. If there are several nearest reader contenders, the system evaluates several nearest reader candidates and makes a determination about the nearest reader.

In most situations the tag is not situated directly at a reader. The tag is typically positioned between two or more readers. It is important to note that the home zone of the nearest reader may not be the zone where the tag is finally determined to reside. Determining the nearest reader, however, provides the necessary anchor point to subsequently determine the actual location of the tag.

Once the nearest reader has been found, reader signal strength indicator (RSSI) comparisons are made between it and the list of readers that the nearest reader has in its adjacent readers list, i.e. readers in proximity.

By comparing the RSSI values, after any necessary compensation, of the nearest readers and the adjacent readers, the most likely zone is determined. Note that the list of adjacent readers does not include readers that may be physically adjacent, but to which the tag cannot readily travel without significant elapsed time, or without passing one or more other readers, e.g. the reader immediately below the tag on the next floor below, although technically adjacent, is not listed as adjacent. In a way, this is similar to determining the distance between the two readers, but it relies upon RSSI, the reader's softwareRSSI, CloseProximitySoftwareRSSI, and the adjacentReaders.relativeRSSI values.

The overall flow of the algorithm is summarized as follows:
Evaluate the tag read List
Evaluate nearest reader probabilities
Select the closest reader
Identify the zone.

When the algorithm begins, two global variables are initialized. The LocationConfidence, which is set to Confidence_High; and the ZoneConfidence, which is set to Confidence_High. As the algorithm progresses, the confidence factors may be decremented based on uncertainty generated by the data.

Figure 2:
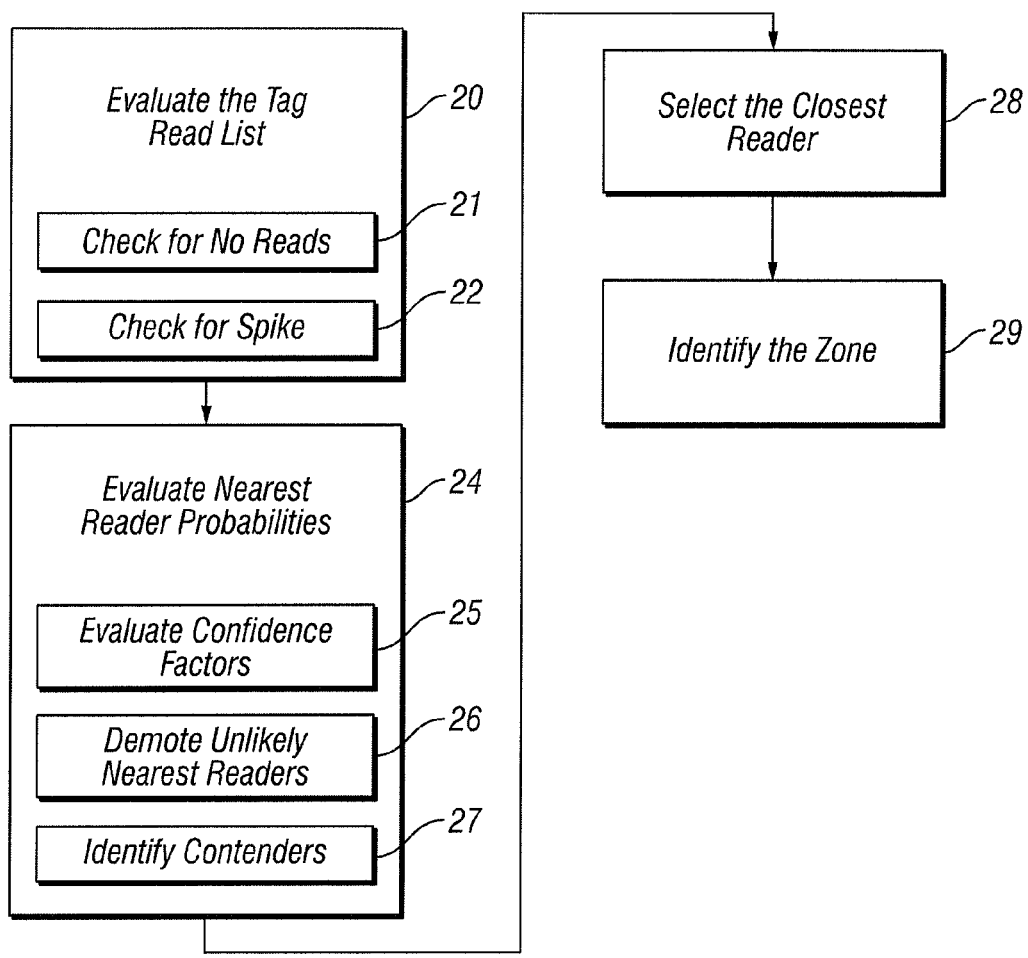
FIG. 2 is a flow diagram showing zone determination by combining signal strength with topological factors according to the invention.

FIG. 2 is a flow diagram showing zone determination by combining signal strength with topological factors according to the invention.

Stage 1: Evaluate the Tag Read List (20)

This determines if there are any reads, handles any tag missing scenarios, and adjusts for any spurious spikes in the RSSI value.

Step One—Check for No Reads (21)

Before too many cycles have passed, the algorithm needs to check for a tag-missing scenario. If there are no records in the adjusted tag reads list, i.e. the tag was not read this iteration, the algorithm checks to see if the unadjusted list includes any raw tag reads.

If it does, then the algorithm may call the TrackingManager.SetAlarm and advise that there is a faint read. The algorithm then concludes and returns: the tag-read datetime from the raw readlist, and ZERO for any other factors, indicating that nearest location and zone were indeterminate.

Else, the algorithm calls TrackingManager.SetAlarm and indicates that the specified tag is missing. The algorithm then concludes and returns: the datetime that was passed as input by the marshaler, and ZERO for the other four factors, indicating that nearest location and zone were indeterminate.

The TrackingManager.SetAlarm may need to evaluate the Zone.DeadSpots property when deciding what event/event data to disseminate.

Step Two—Check for Spike (22)

On occasion, during normal operation, a spurious high RSSI read occurs. This spike effect is compensated for in this step. However, a spike test can only reliably be performed when the tag frequency is high. If the tag, for example, only transmits every 30 seconds, it is quite conceivable that the current RSSI value could be 40 units higher than the previous read because the tag could have easily moved 30 meters. The TagType class includes a Spike_Check_Threshold property, which is used as follows:

If the TagType.Spike_Check_Threshold is zero, i.e. no spike check is required, the algorithm moves to the next step.

If the ReaderBean.Eliminate_Spikes is false, no spike check is required, and the algorithm moves to the next step. This might occur on a reader location at an elevator, e.g. reads may suddenly appear as people step out of the elevator.

Otherwise, each tag read is evaluated in turn, and the current adjusted RSSI value is compared with the previous adjusted RSSI value for that same reader. The algorithm may need to evaluate more than the previous read, i.e. the last N reads. It is possible to adjust the algorithm, if necessary, after field tests. If the delta is greater than the TagType.Spike_Check_Threshold, then the algorithm assumes that it is a spike. The NormalizedRSSI value is then set to the previous adjusted RSSI value. This reduces the probability that this is the nearest reader.

Stage 2: Evaluate Nearest Reader Probabilities (24)

In many situations the reader with the highest RSSI values is not the logical nearest reader, e.g. it might be on the floor below.

Step One—Evaluate Confidence factors (25)

The list of adjusted reads is sorted by reader guarantee degree factor.

If there is one reader with a Reader.guaranteeDegree value of 5, then evaluation is complete and the algorithm concludes and returns: the tag-read datetime for that reader, the ReaderBean.LocID, Confidence_High, Readerbean.ZoneID, Confidence_High.

If there is more than one reader with a Reader.guaranteeDegree value of 5, then the Nearest_Reader list is populated with these readers, the LocationConfidence is set to Confidence_medium, and the algorithm moves to step 3.

Step 2—Demote Unlikely Nearest Readers (26)

In some situations, especially multi-floored installations and highly walled facilities with limited doorways between areas, a physically close reader may be in a very different zone. In other words, due to the constraints on an objects travel path, it is unlikely that the tag has so quickly moved to the other reader, e.g. they have to go a long way to pass through a doorway, or they need to go through two other zones, such as the stairwell and the next floor's lobby, to get to the reader. Thus, this step is only executed when there are no readers with Reader.guaranteeDegree value of 5.

This step therefore attempts to eliminate any nearest reader contenders that may, in fact, have been reading the tag from a remote location, to where the tag is unlikely to have been able to travel. Consequently, this step is only merited when the tag frequency is high, i.e. when the tag can only have moved a short distance since the last transmission. The TagType.Eliminate_Remote_Readers is configured to indicate whether such demotion evaluation should be performed.

The algorithm checks the TagType.Eliminate_Remote_Readers, if it is False, then the algorithm jumps to Step 3. Otherwise:

Demote RSSI Values

The algorithm evaluates the previous location determination, i.e. the output from the previous instance of the thread. The algorithm iterates down the list of tag reads.

If the Readerbean.Eliminate_Remote_Readers is false, then the NormalizedRSSI value is not adjusted. This might occur, for example, when reader is on the perimeter of a facility, or when the reader is near an elevator.

Else if the readerbean.locid is equal to the previous determination's readerbean.locid then the NormalizedRSSI value is not adjusted. This is because the data show that the tag appears to be in the same place, or at least a similar distance from this reader.

Else, if the last Location determination has a confidence of Confidence_Medium or higher, the algorithm iterates through the previous determination's readerbean.locid.AdjacentReaderEntry.ReaderBean.LocID. If there is a match to the current readerbean.locid, then it appears that the tag could have moved to this reader since the last read, and the NormalizedRSSI value is not adjusted. If there is no match, the NormalizedRSSI value is factored by the ReaderBean.NonAdjacentNormalizeFactor. The point of making this a configurable property of the ReaderBean is that it allows an individual reader to be configured to solve its unique RSSI issues.

In general, however, the system should have a default value of, e.g. 0.8, and a null in the ReaderBean would imply that the system default should be used.

Else, if the last Zone determination has a confidence of Confidence_Medium or higher, the same process as the immediately preceding step is conducted, where the algorithm iterates through the list of readers in the zone, looking to see any of those readers might be in the proximity of the reader being evaluated. The same comparison and adjustments are made if no match is found.

Else, there is now a situation where there was little confidence in the prior reader determination, or the prior Zone determination, and there is no credible way to check that the recent read was consistent with the prior location. In this case, the system does not demote anything and it moves on, i.e. NOOP.

Step 3—Identify Contenders (27)

The algorithm must determine the nearest reader to the tag, or a list of the candidates for the nearest reader when there is no clear winner. The output of this stage is a list of nearest readers, i.e. the contenders. Note, it is assumed that non-contenders are deleted from the adjusted input list. After this step, the list only contains the contenders.

If there is only one reader in the list, then the job is done, move to next step.

If there is more than one reader in the list, two essential steps remain to be conducted:

The list must be sorted with the highest probability read first; and

A cutoff must be determined so that reads falling below a certain threshold are eliminated.

Determining the Probability

There are several data which influence the probability: the similarity between the Adjusted RSSI and the Normalized RSSI, the comparison of the Normalized RSSI with the ReaderBean.CloseProximitySoftwareRSSI, and the magnitude of the RSSI. To accommodate these data, the algorithm computes a ranking value that is a singular integer: the higher the value, the higher the probability that this is the nearest reader. Note that this value may often be negative.

Note that this portion of the algorithm is preferably written as a distinctly separate function. It is possible to adjust and amend the core of this ranking based upon evaluation of real world scenarios.

For each record in the list of reads:

If the ReaderBean.CloseProximitySoftwareRSSI is non null (or non zero), the initial value of the Ranking value is set to (ReaderBean.CloseProximitySoftwareRSSI)−(Normalized RSSI value) which may have a positive or negative result.

Else, the ranking value is set to (Default_Close_Proximity_software_RSSI)−(Normalized RSSI value).

If the Normalized RSSI value is the same as the Adjusted RSSI value, e.g. it is a reader in proximity to the last read, then the Ranking value is factored by the Adjusted_Equals_Normalized factor.

Determining the Cut Off

To reduce the permutations that are run in Stage 3 (below), the unlikely candidates must be eliminated.

If the list has one entry, exit this step and move to Stage 3

The algorithm iterates down the set and identifies all the records that have a Normalized RSSI value which is greater than the ReaderBean.SoftwareRSSI, if the count of the matching records is one or greater, delete the non-qualifying records, i.e. the records that are less than the SoftwareRSSI).

If the set has one entry, exit this step and move to Stage 3.

The set is sorted in descending order by the Ranking value.

If the highest Raking value is less than the Alternative_Computation_Ranking_Trigger, then the algorithm discards its set, and processing switches to the Alternative Location Determination (discussed next)

Any record with a Ranking value less than Contenders_Percentage_To_Leader of the top value is deleted. In some embodiments, the data are normalized to have positive values if the percentage computation is to make sense.

The set now contains the list of contenders; exit this step and move to Stage 3.

Alternative Location Determination

This process is invoked when the data fail to show that there is a least one candidate reader with a strong adjusted RSSI value. In other words, it is not certain where the tag is located. The LocationConfidence is set to Confidence_mediumlow.

The Set is initialized to the adjusted input list and sorted, descending, by Adjusted RSSI value.

The Set is iterated and the AdjustedRSSI is compared to the ReaderBean.CloseProximitySoftwareRSSI, if the count of the matching records is one or greater, delete the non-qualifying records, i.e. the records less than the SoftwareRSSI, and proceed to stage three.

The Set is iterated and the AdjustedRSSI each records is assigned a Ranking value. The ranking value in this situation is the percentage value representing where the AdjustedRSSI lies in a range from the ReaderBean. SoftwareRSSI to ReaderBean.CloseProximitySoftwareRSSI or the system defaults.

If there are one or more records that have a Ranking value in excess of the system value Alternative_Percentage_to_Proximity, then delete the records that fall below this threshold and move to Stage 3.

The set is sorted, descending, by Ranking value. If there are more than Alternative_Max_Weak_Candidates in the set, delete the records after the Alternative_Max_Weak_Candidates one, and move to Stage 3.

Stage 3: Select the Closest Reader (28)

At this point, the algorithm has reduced the list of readers to those readers that are assumed to be in reasonable proximity to where the tag was recently, and within that set to the readers with the strongest RSSI values. The reduced set of readers should contain one record for each closest reader candidate.

Each record in the set is appended with two values: the ReaderBean.locID, and ReaderBean.zoneID.

If the list contains one entry for locID, the stage is complete and the algorithm advances to Stage 4.

If the algorithm has achieved its objective, and the tag is somewhere between a collection of readers, at this stage the list of final contenders contains a list of readers that are all in proximity to each other This step involves comparing each readers list of adjacent readers. Each record in the set has a ReferenceCount field. The algorithm iterates the list and compares each record's ReaderBean.adjacentReaders list and if there is a matching on any other records ReaderBean.readerUID, the matching records ReferenceCount field is incremented. After all of the records in the set have been processed, the ReferenceCount field may have a value between zero and (Set Record Count—1). Any records with less then the highest value are deleted.

Step 3 is repeated until all ReferenceCounts are the same, i.e. none are deleted.

The list now contains the readers that surround the tag or, in rare situations, a list of readers which are completely isolated from each other.

If the list contains one entry, the stage is complete and the algorithm advances to Stage 4.

The Set is iterated and the AdjustedRSSI each records is assigned a Ranking Value. The Ranking Value is like a volume indicator and is the percentage value representing where the AdjustedRSSI lies in a range from the ReaderBean. SoftwareRSSI to ReaderBean.CloseProximitySoftwareRSSI, or the system defaults.

The reader with the highest Ranking Value is selected and the others are deleted, the stage is complete and the algorithm advances to Stage 4.

By definition the closest location is the closest reader's ReaderBean.locID.

Stage 4: Identify the Zone (29)

In most situations the tag is not situated directly at a reader. The tag is positioned between two or more readers. This stage uses the signal strength values of the last set of reads, and compares them with the signal strengths at adjacent readers to estimate the zone. This evaluation is preferably performed multiple times, once for each nearest candidate. A probability is calculated for the selected zone through each iteration. However, it may not be necessary because the results from algorithm may suffice. A final determination of whether to perform this test on multiple candidate nearest readers is made, when an in the field performance testing is conducted. For the present embodiment of the invention, it is assumed that one Zone calculation is sufficient.

The input list of Adjusted RSSI data are iterated. Assume that there is an additional field ZoneCandidate.

Any records that are not in the Closest Readers ReaderBean.adjacentReaders list are eliminated. We are now left with the closest reader and the adjacent readers that got a read greater than their ReaderBean.softwareRSSI value.

If all the remaining readers have the same ReaderBean.ZoneID, the Zone has been identified and the stage is complete Else, the algorithm compares the Closest Readers Adjusted RSSI value with the each other readers Adjusted RSSI[1] value, and determines which zone is likely based on the adjacentReaders.relativeRSSI value. The winning zone is stored in the ZoneCandidate.

Any record, other than the closest readers, with a ZoneCandidate value the same as the Closest Readers ReaderBean.ZoneID is deleted.

If there is only the closest reader's record remaining, the zone is Closest Readers ReaderBean.ZoneID and the algorithm is complete, Else, the Zone_Confidence is set to Confidence_Medium, and the algorithm computes the confidence of each remaining ZoneCandidate. This is achieved by iterating down the list of remaining readers as follows:

The difference in adjusted RSSI between the Closest Reader and the current reader's RSSI is computed (although a post-Spike adjusted value may be used);

The result of the immediately preceding step then has the Closestreader.relativeRSSI value subtracted;

The record in the set with the largest value from the immediately preceding step is selected;

If the any non selected ZoneCandidiates values from the second step above is less than Tough_Zone_Choice lower than the largest value, the Zone_Confidence is set to Confidence_MediumLow.

The winning zone is this ReaderBean.ZoneID.

If the LocationConfidence is Confidence_MediumLow or lower then the Zone_Confidence is set to the LocationConfidence. In other words, if we are not confident about the location we cannot really be confident about the zone either.

The computation is complete and the selected values are returned, just in time to begin the process all over again.

Computer System Overview

Those skilled in the art will appreciate that the invention herein is implemented in a computer. For purposes of example, and not by way limitation a computer comprises a processor, main memory, storage media, input devices, and peripherals, all coupled together by a system bus. The computer may exist in a network or any one or more of its individual elements may be distributed across a network. The storage media comprises a mass storage and zero or more other drives. The mass storage comprises an operating system and one or more regular applications, such as a Web browser. For the sake of simplicity, only these components are discussed. If so desired, computer system may comprise additional components.

Processor

The processor is the component responsible for executing instructions to provide the overall functionality of the computer system. For purposes of the invention, the processor may be any type of processor that is capable of executing any type of computer instructions. For the sake of simplicity, only one processor is herein. However, it should be noted that the computer system may comprise additional processors, if so desired.

Main Memory

The main memory provides the memory needed by the processor to execute programs. More specifically, the processor uses the main memory to store program instructions while those instructions are being executed. In addition, the processor uses the main memory to store data and other information generated during the execution of instructions. Furthermore, the main memory may be used to store the computer system state information. The use and management of the main memory is discussed in greater detail below.

User Interface

Various output components may include, for example, a video card, a video display, an audio card, and a set of speakers. These components enable the computer system to provide information to a user. The input devices enable the user to provide information to the computer system. The input devices may include, for example, a keyboard, an infrared receiver for receiving infrared signals, such as signals from a remote control, and a cursor control device such as a mouse, a trackball, a remote-controlled pointing device, etc. Basically, anything that enables the computer system to interface with a user can be included as user interface components.

Storage Media

The storage media provides non-volatile storage for the computer system. The storage media may comprise a mass storage magnetic hard drive, and zero or more other drives. The other drives may include, for example, a floppy drive, a CD-ROM drive, a DVD drive, a CD-RW drive, etc. The drives enable the computer system to read from and write to storage media other than hard drive. All of the storage media may be accessed via a common controller interface, such as an IDE interface. While the storage media are described herein as drives, it should be noted that storage media need not be drives but, rather, may take on other forms, for example, disk-on-chip modules, flash memory, etc. All possible forms are within the scope of the invention.

The mass storage comprises a plurality of programs, including an operating system and one or more applications. The operating system is the general-purpose operating system that is loaded and executed during a regular boot-up process to provide an overall operating environment for the computer system. The applications, such as a Web browser, run within the environment provided by the operating system. For purposes of the invention, the operating system may be any operating system, including but not limited to Windows XP®. The inventive algorithm herein described is implemented in an application program.

Peripherals

In addition to the components already described, the computer system may further comprise other peripherals, such as printers, scanners, network cards, RFID readers, etc. These peripherals may interface with the computer system via various ports and interfaces, such as parallel ports, serial ports, USB ports, SCSI interfaces, etc. Generally, any device that is capable of interfacing with the computer system can be included as one of the peripherals.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for combining RFID tag signal strength computations with factors that incorporate physical realities to determine a tag's real-time location, comprising the steps of:

evaluating a tag read list comprised of reader reception of signals emitted by said tag, said evaluating step including the steps of checking for locations in which no read is made indicative of physical obstructions and for locations in which there are spikes in tag signal strength indicative of spurious signal strength;

evaluating nearest tag reader probabilities, including the steps of evaluating confidence factors, demoting unlikely nearest readers, and identifying contenders based on the evaluated locations of no read and locations of spikes and likelihood of traversal of the tag from a previous reader location to the current reader location based on said physical realities;

selecting a closest reader based on the evaluated nearest tag reader probabilities; and identifying a zone within which said tag is located based on said selected closest reader.

2. An apparatus for combining RFID tag signal strength computations with factors that incorporate physical realities to determine a tag's real-time location, comprising:

a processor configured for evaluating a tag read list comprised of reader reception of signals emitted by said tag, said processor comprising modules for checking for locations in which no read indicative of physical obstructions is made and for locations in which there are spikes in tag signal strength indicative of spurious signal strength;

said processor configured for evaluating nearest tag reader probabilities, said processor comprising modules for evaluating confidence factors, demoting unlikely nearest readers, and identifying contenders based on the evaluated locations of no read and locations of spikes and likelihood of traversal of the tag from a previous reader location to the current reader location based on said physical realities;

said processor configured for selecting a closest reader based on the evaluated nearest tag reader probabilities; and said processor configured for identifying a zone within which said tag is located based on said selected closest reader.

* * * * *